Aug. 25, 1942.  W. C. PLATT  2,294,128
METHOD FOR RECOVERING VALUES FROM CITRUS FRUIT
Filed June 25, 1940  2 Sheets-Sheet 1
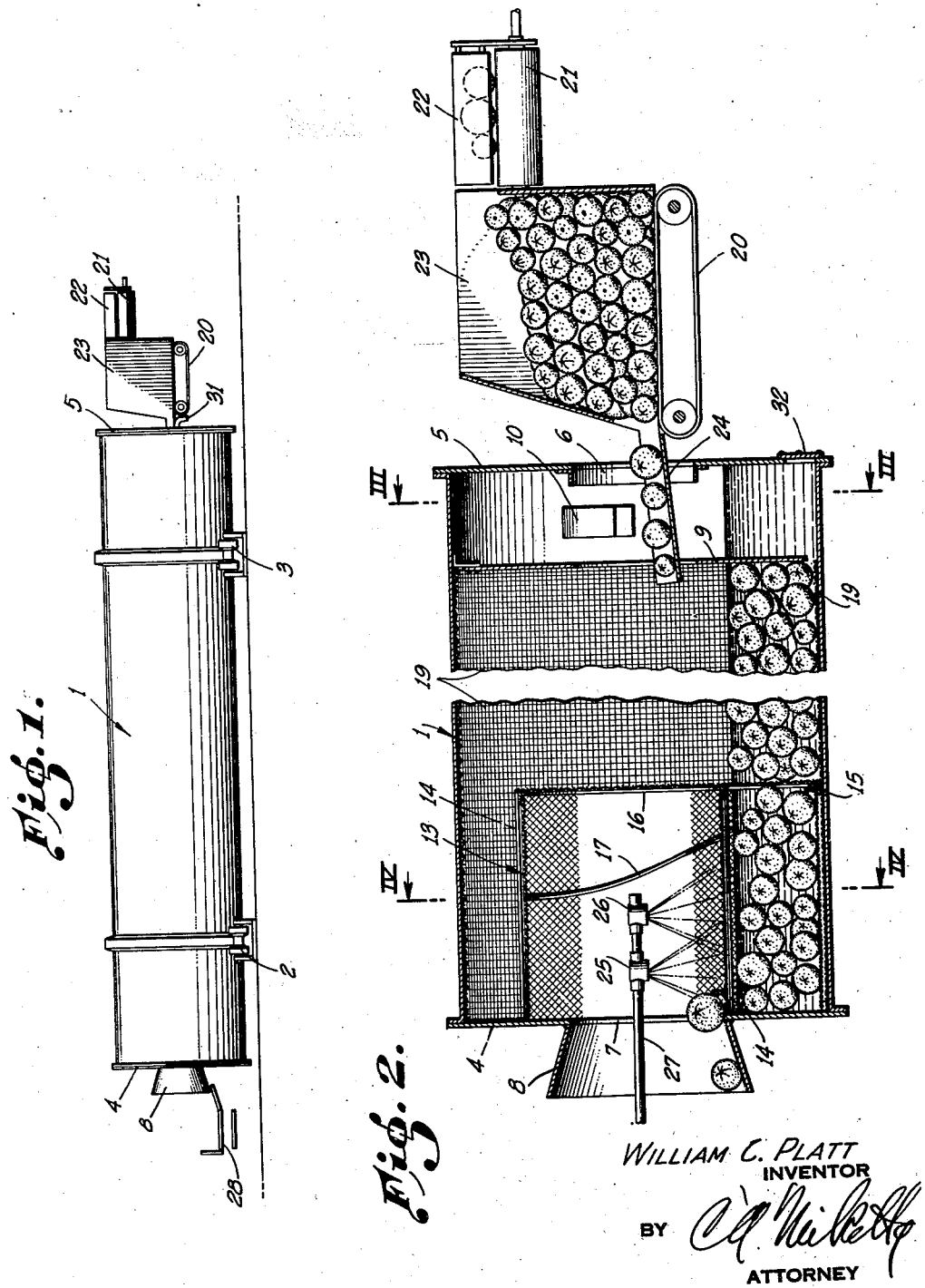
WILLIAM C. PLATT
INVENTOR
BY
ATTORNEY Aug. 25, 1942.   W. C. PLATT   2,294,128
METHOD FOR RECOVERING VALUES FROM CITRUS FRUIT
Filed June 25, 1940   2 Sheets-Sheet 2
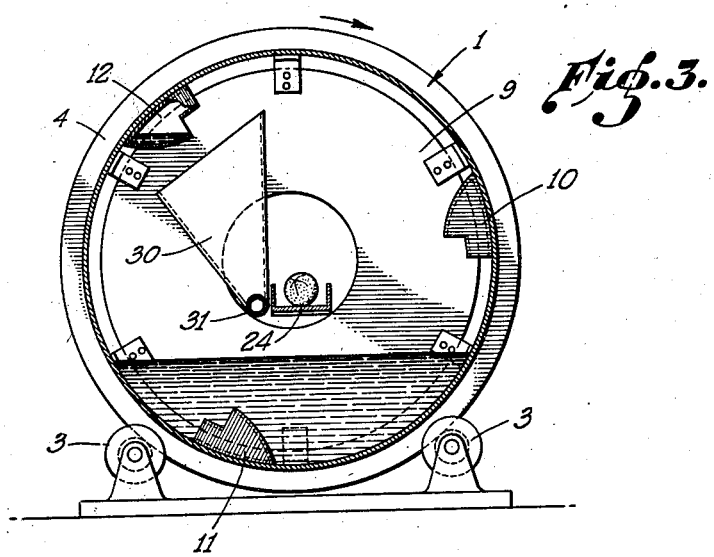
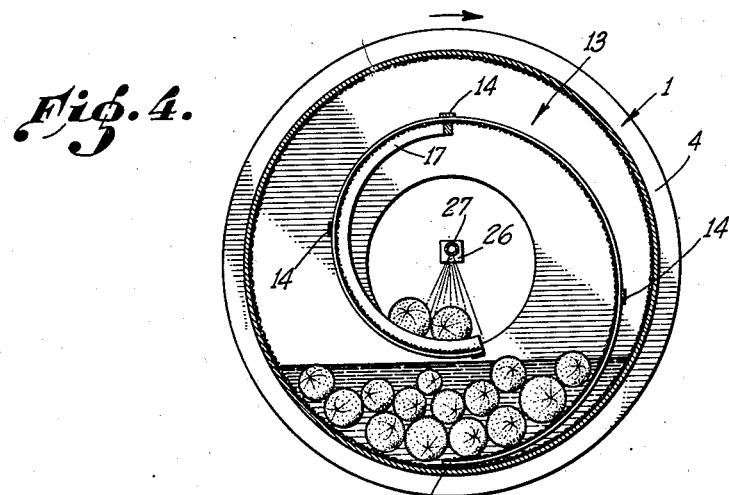
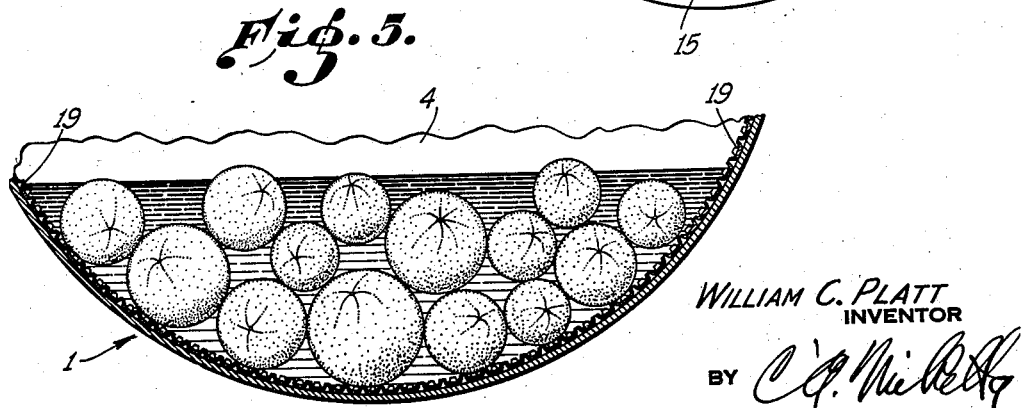
WILLIAM C. PLATT
INVENTOR
BY
ATTORNEY Patented Aug. 25, 1942

2,294,128

UNITED STATES PATENT OFFICE 2,294,128

METHOD FOR RECOVERING VALUES FROM CITRUS FRUIT

William Carrington Platt, Ontario, Calif., assignor to California Fruit Growers Exchange, Los Angeles, Calif., a corporation of California Application June 25, 1940, Serial No. 342,274

5 Claims. (Cl. 99—105)

This invention pertains to methods whereby valuable products may be recovered from citrus fruit and whereby citrus fruit may be treated in a rapid, inexpensive and controllable manner.

More particularly, the methods of the present invention pertain to the recovery of citrus oil and of citrus juices as separate products.

All citrus fruit comprise an external flavedo which contains oil cells and pigments, an internal arrangement of segments containing juice sacs, and an intervening layer of spongy absorbent cellulosic material known as "albedo." Citrus oils have heretofore been recovered from the skin, peel or flavedo layer of citrus fruit in a number of different ways, but all of the previously known methods have distinctive disadvantages. If, for example, the entire fruit is rolled or pressed, or both, the oil is absorbed to some extent in the albedo. Much of the oil is rendered unrecoverable unless distilled because of such absorption and moreover, the separation of the oil from the juice of the fruit is difficult. In many instances, the citrus juice acquires a distinctly disagreeable and undesirable odor and flavor. A citrus juice containing appreciable amounts of oil has undesirable physiological effects. Other manual methods are extremely time-consuming and the yields obtained are relatively low.

An object of the present invention is to devise methods whereby the oil-containing cells of the flavedo are punctured, opened or otherwise caused to discharge their oil content without injuring the remainder of the fruit and without unduly exposing the albedo so that the absorption of the liberated oil by the albedo is minimized or completely eliminated.

Furthermore, it is an object of the present invention to disclose methods whereby the oil cells of the flavedo may be caused to liberate their contained oil without cutting or otherwise exposing the juice sacs to the action of air or other elements, thereby permitting the central portion of the fruit to retain its naturally provided protective coating of albedo and thereby permitting the use of the fruit as a source of citrus juice of good quality.

Generally stated, these objects have been attained by rolling the citrus fruit over an abrading surface for the purpose of puncturing and opening the oil cells of the flavedo and in reducing the pressure of the fruit against such abrading surface by immersing the surface and the fruit in a liquid of somewhat lower density than the fruit so that the fruit is buoyed up by a force equal to the weight of the fluid displaced. In this manner, the abrading surface exerts a positive but gentle pressure against the fruit and the oil cells of the flavedo are punctured and abraded to a required degree without permitting the albedo to absorb undue quantities of the oil liberated from the oil cells. When this method of operation is conducted in the preferred manner, the flavedo is not completely removed and the albedo is not exposed, or only partially exposed. It is to be understood that the line of demarcation between the flavedo and albedo is indefinite.

Additional objects and advantages of the methods of this invention will be more readily understood by those skilled in the art from a consideration of an exemplary form of the invention shown in the appended drawings and a more detailed description of the method as given hereinafter. In order to facilitate understanding, reference will be had to the appended drawings, in which:

Fig. 1 is a side elevation of one form of device in which the method may be carried out.

Fig. 2 is an enlarged vertical section taken through the device shown in Fig. 1, central portions of the device having been broken away.

Fig. 3 is a transverse section taken along the plane III—III of Fig. 2.

Fig. 4 is a transverse section taken along the plane IV—IV of Fig. 2.

Fig. 5 is an enlarged transverse section, partly diagrammatic, of the bottom of the device at an intermediate point.

As previously stated, the method of the present invention contemplates puncturing the oil cells of the flavedo of citrus fruit by rolling the fruit over an abrading surface. In order to reduce the pressure of the fruit against such abrading surface and thereby prevent undue removal of the flavedo and undue exposure of the albedo, the fruit and the abrading surface are immersed in a liquid. It is well known that a body immersed in a fluid is buoyed up by a force equal to the weight of the body displaced. The liquid in which the fruit are immersed not only acts to reduce contact pressure between the fruit and the abrading surface but also provides an ambient liquid capable of receiving the oil liberated by the punctured cells as soon as such cells are punctured, torn or otherwise opened. The liquid, generally water, acts as a carrier for the fruit and facilitates its movement and at the same time absorbs the liberated oil as soon as the oil cells are punctured and in this manner also acts as a carrier for the oil.

Furthermore, the method of the invention contemplates the steps of establishing a body of liquid, adding citrus fruit thereto, and establishing and maintaining a countercurrent flow of fruit and liquid during the oil-extracting process. Citrus fruit from which oil has been extracted may be discharged from one end of the apparatus while oil-carrying liquid may be removed from the other end of the apparatus. Such oil-carrying liquid is then sent through suitable separators, preferably of the centrifugal type, for the removal of the oil from the liquid. The treated citrus fruit discharged from the other end of the apparatus may then go to suitable juice-extracting devices, such as roller mills, crushers, extractors, etc. In this manner, citrus juice uncontaminated with excessive or undesirable amounts of citrus oil and thereby free from the undesired odors and flavors is obtained while a high yield of citrus oil of good quality is separately recovered from the same fruit.

The apparatus illustrated in the appended drawings has been found to be eminently suited to the performance of this method. As there shown, a cylinder 1 is rotatably supported as at 2 and 3 in a substantially horizontal position. The cylinder is provided with inwardly extending flanges at each end, such flanges being indicated at 4 and 5, so as to leave axial openings which, for the purpose of simplicity, will be termed the fruit feed opening 6 and the fruit discharge opening 7. The latter may be provided with a conical spout 8.

Adjacent the fruit inlet 6 is a fruit-restraining means positioned in the cylinder 1. Such fruit-restraining means may comprise an annular disc 9 suitably attached to the interior of the cylinder and provided with perforations or with sufficient space between the disc and the inner walls of the cylinder to permit liquid to freely pass therethrough. Means are provided for removing liquid from the cylinder adjacent the fruit-feeding end thereof and such means may comprise a plurality of dippers 10, 11 and 12 which may be carried by the internal surface of the cylinder 1 between the end flange 5 and the fruit restrainer 9, or an end flange.

The fruit discharge end of the cylinder 1 is provided with a fruit pick-up and discharge device capable of removing fruit from the cylinder and discharging the same through the port 7 and spout 8. In the illustrative form shown in the drawings, the fruit pick-up and discharge comprises a foraminous spiral 13 attached to the inwardly extending end flange 4 by a suitable framework including members such as 14, one end of said spiral terminating at the level of the port 7 while the other end of the spiral rests upon or is in close contact with the inner surface of the cylinder 1, as indicated at 15. The inner end or back of the spiral is closed with a foraminous member 16.

The portion of the spiral pick-up 13 contiguous to the discharge port 7 may include a helical blade 17 carried on the internal surface of the pick-up member for the purpose of positively advancing fruit picked up by the said pick-up device during rotation of the cylinder 1 axially of the device and through the port 7 and spout 8.

The inner surface of the cylinder 1 is preferably lined with an abrasive material capable of puncturing, tearing or opening the oil cells present in the skin or peel of the fruit. Although various materials may be used as liners, good results have been obtained by lining the cylinder 1 with an inwardly perforated sheet of metal most clearly shown in Fig. 5 at 19. These inwardly extending perforations may vary in number per square inch within wide limits but in actual practice it has been found that perforations varying from about 64 to 98 per square inch are well suited. The upstanding, inwardly extending, deformed portions of metal adjacent each perforation may range from about $\frac{1}{32}$ inch to about $\frac{3}{32}$ inch in height. Metals perforated in this manner constitute a grater-like surface.

At this time attention should be called to the fact that all metals employed in the apparatus should be non-corrodible by acidic solutions. Iron and mild steel have been found satisfactory; copper is not a preferred metal for use in this equipment.

A body of liquid is maintained in the cylinder, the maximum depth of the liquid being dependent upon the distance between the inner surface of the liner and the lowermost portion of the fruit inlet and outlet ports 6 and 7 respectively. It is desirable to maintain a body of liquid sufficient to immerse the fruit being treated. If, therefore, ordinary citrus fruit such as oranges are being treated, the minimum depth of liquid should be about 4 inches, although greater depths can well be employed. In actual practice, on oranges the maximum depth of liquid within the cylinder 1 is about 10 inches. Obviously, the depth of the liquid may vary with the size of the fruit being treated, the internal diameter of the cylinder 1, etc.

Means are provided for feeding fruit into this body of liquid. For example, fruit may move along a conveyor belt 21 (toward the observer in Fig. 2) and be deflected by means of a weighted gate 22 into a bin 23 provided with a chute 24 extending through the fruit inlet port 6, past the fruit-restraining dam 9, into the body of the cylinder 1. The belt 21 is ordinarily driven in any suitable manner and citrus fruit is permitted to pile up in the bin 23 due to excessive feed by the conveyor belt 21. When the bin 23 is filled, the weighted hinged gate 22 will open, permitting the fruit carried by the belt to pass the bin 23 to another unit, machine, conveyor, or the like. The bottom of the bin 23 is provided with a conveyor 20 driven by a variable speed motor, this belt moving the fruit from the bin into the chute 24 and into the cylinder 1. Rate of feed is therefore controlled by the variable speed conveyor 20.

The fruit supplied to the cylinder 1 are preferably washed before being admitted thereto but need not be either washed or graded for size. The body of the cylinder becomes filled with a mass of fruit partially suspended in the body of water contained therein, and such mass of fruit moves from the fruit-feeding end to the fruit-discharge end under the influence of the additional fruit which is continuously being fed to the cylinder. The fruit pick-up and discharge device 13 continually removes treated fruit from the cylinder 1 and in that manner, movement of fruit from one end of the cylinder to the other is established.

As the fruit are removed by the pick-up device 13, they are sprayed with liquid through spray heads 25 and 26 positioned within the discharge device and supplied with liquid by means of line 27. Residual surface oil or oil-containing liquid carried by the fruit are thus rinsed therefrom before the fruit are discharged onto a conveyor belt 28 leading to suitable juice-extracting equipment, such as crushers, rollers, or the like.

Countercurrent flow of liquid and fruit is established within the cylinder 1 by admitting fresh liquid through the spray heads 25, 26, and removing oil-containing liquid from a point adjacent the fruit inlet 6. The dippers 10, 11 and 12 previously mentioned pick up oil-containing liquid and discharge the same into a suitable trough 30 having the outlet line 31 leading to separators capable of removing and separating the oil from the liquid. A drain plug 32 is shown for the purpose of facilitating discharge of contents whenever the apparatus is shut down for repairs, cleaning, or the like.

Although a particular form of dippers is shown in Figs. 2 and 3, it is to be understood that the shape, form, disposition and number of dippers may vary. Moreover, other forms of liquid discharge devices may be employed. The capacity of the dippers and their number will depend upon the speed of rotation of the cylinder and the rate at which fresh liquid is admitted to the cylinder through the spray heads 25 and 26. The discharge capacity of the dippers and the supply of fresh liquid should be substantially balanced so that a virtually constant body of liquid is maintained within the cylinder. It is to be understood that the cylinder rotates during operation so that the citrus fruit supplied thereto are caused to contact with the bottom of the cylinder, the rotation of the cylinder causing numerous inwardly extending sharp edges of the abrasive lining 19 to puncture the oil-containing cells of the flavedo. Undue abrasion is prevented because the fruit are buoyed up by the liquid. In the event fruit of varying sizes are being supplied to the apparatus, it will be found that the larger fruit will have their flavedo removed to a much larger degree than small fruit. If, however, sized or graded fruit are supplied to the machine, then the rate of feed may be carefully adjusted so that a well controlled and substantially uniform amount of the flavedo is removed during the operation.

An apparatus of the character described hereinabove having an internal diameter of about 3 feet and an approximate length of 22 feet, rotating at about 36 R. P. M. is capable of treating 5 tons of oranges per hour. When water is used as the buoying liquid, from 200 to 300 gallons of water may be added to the equipment per hour, the liquid removed from the apparatus then containing approximately 1% to 3% of oil, which is very readily separable from the liquid. It has been found that the method of operation described herein permits a recovery of approximately twice the amount of oil capable of being obtained by rolling and pressing. Furthermore, the oil so produced is lighter in color and is of good quality.

I claim:

1. A method of treating citrus fruit to produce citrus oil which comprises: puncturing the oil cells of the flavedo of citrus fruit by rolling the fruit over an abrading surface, reducing the pressure of the fruit against such abrading surface by immersing such surface and fruit in a liquid, removing fruit from the liquid, and separating dispersed citrus oil from said liquid.

2. In a method of extracting citrus oils from citrus fruit, the steps of puncturing the oil cells of the flavedo of citrus fruit by rolling the fruit over an abrading surface, reducing the pressure of the fruit against such abrading surface by immersing such surface and fruit in a liquid of lower density than the fruit, whereby citrus oil is liberated from the flavedo directly into the liquid, and then separating dispersed citrus oil from said liquid.

3. In a method of treating citrus fruit for the separation of citrus oil therefrom, the step of subjecting the flavedo of the fruit to abrasion while said fruit are immersed and suspended in a body of liquid.

4. A method of treating citrus fruit, which comprises: forming a body of water in an oil extraction zone, supplying citrus fruit to said body of water, bringing such fruit, while suspended in such body of water, into contact with a moving abrading surface, continuously removing treated fruit from said extraction zone, and continuously supplying water to said body and removing oil-containing water from said body, whereby countercurrent movement of water and fruit through said body is established.

5. A method of treating oranges, which comprises: forming a body of water in an oil extraction zone, supplying oranges to said body of water, bringing said oranges, while suspended in such body of water, into contact with a moving abrading surface, continuously removing treated oranges from said extraction zone, and continuously supplying water to said body and removing oil-containing water from said body, whereby countercurrent movement of water and oranges through said body is established.

WILLIAM CARRINGTON PLATT.